US009501108B2

(12) United States Patent
Lee et al.

(10) Patent No.: US 9,501,108 B2
(45) Date of Patent: Nov. 22, 2016

(54) ELECTRONIC DISPLAY SYSTEM WITH A SUPPORT STAND

(71) Applicant: Hewlett-Packard Development Company, L.P., Houston, TX (US)

(72) Inventors: Peter K Lee, San Jose, CA (US); John W. Pennington, Jr., Mountain View, CA (US); Ken Robertson, Sunnyvale, CA (US); Jacques Gagne, Sunnyvale, CA (US); Bruce Eisenhauer, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/763,460

(22) PCT Filed: Mar. 14, 2013

(86) PCT No.: PCT/US2013/031289
§ 371 (c)(1),
(2) Date: Jul. 24, 2015

(87) PCT Pub. No.: WO2014/142868
PCT Pub. Date: Sep. 18, 2014

(65) Prior Publication Data
US 2015/0362962 A1    Dec. 17, 2015

(51) Int. Cl.
*G06F 1/18* (2006.01)
*G06F 1/16* (2006.01)
*E05D 11/08* (2006.01)

(52) U.S. Cl.
CPC ............. *G06F 1/182* (2013.01); *E05D 11/087* (2013.01); *G06F 1/1601* (2013.01); *G06F 1/1616* (2013.01); *G06F 2200/1631* (2013.01)

(58) Field of Classification Search
CPC .... G06F 1/182; G06F 1/1602; G06F 1/1681; G06F 1/1618; G06F 1/162; G06F 2200/1631; G06F 1/1601; G06F 1/1616; B65D 58/00; E05Y 2900/606; E05D 11/087
USPC ........... 248/917–923, 454; 16/337–340, 374, 16/382, 387, 250; 403/119, 120
See application file for complete search history.

(56) References Cited

U.S. PATENT DOCUMENTS

| 5,092,552 A | 3/1992 | Dayton et al. |
| 5,231,734 A | 8/1993 | Rude |

(Continued)

FOREIGN PATENT DOCUMENTS

EP          1312851 B1     2/2007

OTHER PUBLICATIONS

Eitelbach, D., "Sony VAIO Tap 20 Review," Windows 8 Tablet Review, Oct. 11, 2012, 8 p. ~http://www.laptopmag.com/reviews/tablets.

(Continued)

*Primary Examiner* — Nkeisha Smith
(74) *Attorney, Agent, or Firm* — HP Inc Patent Department

(57) ABSTRACT

An example electronic display system including a housing with a recess, a top side, and a bottom side opposite the top side and a kickstand having a first end and a second end opposite the first end, the first end being rotatably coupled to the housing proximate the bottom side, and the second end being rotationally biased away from the housing. A variable friction assembly is coupled to the first end. The kickstand has a first position in which the second end is received within the recess, and a second position in which the second end is substantially rotatably separated from the recess. Further, the variable friction assembly applies a first friction load to the first end when the kickstand is the first position, and a second friction load when the kickstand is in the second position, wherein the first friction load is greater than the second friction load.

14 Claims, 13 Drawing Sheets

(56) References Cited

U.S. PATENT DOCUMENTS

| | | | | |
|---|---|---|---|---|
| 5,375,076 A * | 12/1994 | Goodrich | ............... | G06F 1/1626 361/679.17 |
| 5,436,792 A * | 7/1995 | Leman | ................. | F16M 11/041 16/326 |
| 5,542,505 A * | 8/1996 | Kempf | ................. | E05D 11/084 16/308 |
| 5,652,694 A | 7/1997 | Martin | | |
| 5,697,125 A * | 12/1997 | Gannon | ................ | E05D 11/082 16/342 |
| 5,771,539 A * | 6/1998 | Wahlstedt | ............... | F16D 7/022 16/285 |
| 5,894,633 A | 4/1999 | Kaneko | | |
| 6,467,129 B1 * | 10/2002 | Bae | ........................ | B60J 3/0265 16/308 |
| 6,570,627 B1 * | 5/2003 | Chang | ................... | F16M 11/10 248/917 |
| 6,609,272 B1 * | 8/2003 | Lee | ....................... | E05D 11/082 16/307 |
| 6,775,884 B2 * | 8/2004 | Su-Man | ................ | G06F 1/1616 16/321 |
| 6,871,384 B2 * | 3/2005 | Novin | ................ | B60R 11/0235 16/337 |
| 6,980,426 B2 * | 12/2005 | Kim | ...................... | G06F 1/1601 248/688 |
| 7,046,509 B2 | 5/2006 | Hillman et al. | | |
| 7,055,215 B1 * | 6/2006 | Ligtenberg | ............ | G06F 1/1616 16/289 |
| 7,143,476 B2 * | 12/2006 | Minami | ................ | G06F 1/1681 16/337 |
| 7,320,152 B2 * | 1/2008 | Lowry | ................... | E05C 17/64 16/297 |
| 7,448,588 B2 * | 11/2008 | Sung | ...................... | F16M 11/00 16/324 |
| 7,513,011 B2 * | 4/2009 | Lu | ........................ | G06F 1/1601 16/337 |
| 7,565,719 B2 * | 7/2009 | Su | ......................... | E05D 11/087 16/337 |
| 7,788,770 B2 * | 9/2010 | Vitito | ................... | E05D 11/084 16/341 |
| 7,916,478 B2 * | 3/2011 | Tu | .......................... | F16M 11/10 248/398 |
| 7,954,203 B2 * | 6/2011 | Chen | ..................... | G06F 1/1681 16/239 |
| 8,069,534 B2 * | 12/2011 | Wang | ................... | G06F 1/1616 16/330 |
| 8,155,714 B2 * | 4/2012 | Allard | .................. | G11B 19/022 455/550.1 |
| 8,201,687 B2 * | 6/2012 | Zeliff | ................... | G06F 1/1626 206/320 |
| 8,226,054 B2 * | 7/2012 | Chen | ..................... | F16M 11/10 16/337 |
| 8,251,341 B2 | 8/2012 | Wang et al. | | |
| 8,266,834 B2 * | 9/2012 | Chen | ..................... | F16M 11/04 235/383 |
| 8,274,784 B2 * | 9/2012 | Franz | ..................... | F16M 11/10 248/634 |
| 8,570,723 B2 | 10/2013 | Myerchin | | |
| 8,576,553 B2 | 11/2013 | Myerchin | | |
| 8,824,158 B2 * | 9/2014 | Huang | ................... | H04M 1/04 361/759 |
| 8,888,062 B2 * | 11/2014 | Novin | ................... | F16M 11/04 248/274.1 |
| 8,922,995 B2 * | 12/2014 | Su | ......................... | F16M 11/10 248/917 |
| 8,950,725 B2 * | 2/2015 | Huang | ................. | F16M 11/105 248/121 |
| 9,013,865 B2 * | 4/2015 | Chen | ..................... | H05K 5/0217 361/679.21 |
| 9,030,813 B2 * | 5/2015 | Chang | .................. | G06F 1/1633 361/679.27 |
| 9,052,873 B2 * | 6/2015 | Murakata | ............. | G06F 1/1626 |
| 2006/0049327 A1 * | 3/2006 | Chen | ..................... | F16M 11/00 248/371 |
| 2006/0082957 A1 * | 4/2006 | Chen | ..................... | G06F 1/1601 361/679.21 |
| 2007/0252056 A1 | 11/2007 | Novin et al. | | |
| 2009/0032672 A1 * | 2/2009 | Cooper | .................... | A63C 5/06 248/544 |
| 2009/0283655 A1 * | 11/2009 | Fukuda | .................. | F16M 11/10 248/454 |
| 2010/0012812 A1 * | 1/2010 | Hu | ........................ | G06F 1/1601 248/454 |
| 2011/0279993 A1 * | 11/2011 | Su | ......................... | F16M 11/10 361/807 |
| 2012/0176742 A1 * | 7/2012 | Luo | ........................ | G06F 1/203 361/679.26 |
| 2012/0178507 A1 * | 7/2012 | Lee | ....................... | A45C 11/00 455/575.1 |
| 2012/0275131 A1 * | 11/2012 | Huang | ................... | G06F 1/166 361/810 |
| 2012/0293931 A1 * | 11/2012 | Liu | ...................... | A47B 23/043 361/679.02 |
| 2013/0021723 A1 | 1/2013 | Harper et al. | | |
| 2013/0079066 A1 * | 3/2013 | Chan | ..................... | H04M 1/04 455/575.1 |
| 2014/0117199 A1 * | 5/2014 | Liu | ....................... | F16M 13/00 248/688 |
| 2014/0224953 A1 * | 8/2014 | Quijano | ................ | F16M 11/046 248/398 |
| 2015/0036290 A1 * | 2/2015 | Yukawa | ................ | G06F 1/1675 361/679.58 |
| 2015/0121654 A1 * | 5/2015 | Novin | ....................... | E05D 3/02 16/273 |
| 2015/0342067 A1 * | 11/2015 | Gault | ................... | H05K 5/0226 248/357 |

OTHER PUBLICATIONS

Microsoft, "Sony VAIO Tap 20," Copyright 2013 Microsoft, 4 p. [Online] http://windows.microsoft.com/en-US/windows-8/sony-vaio-tap-20.

PCT Search Report/Written Opinion ~ Application No. PCT/US2013/031289 dated Dec. 19, 2013 ~ 12 pages.

* cited by examiner

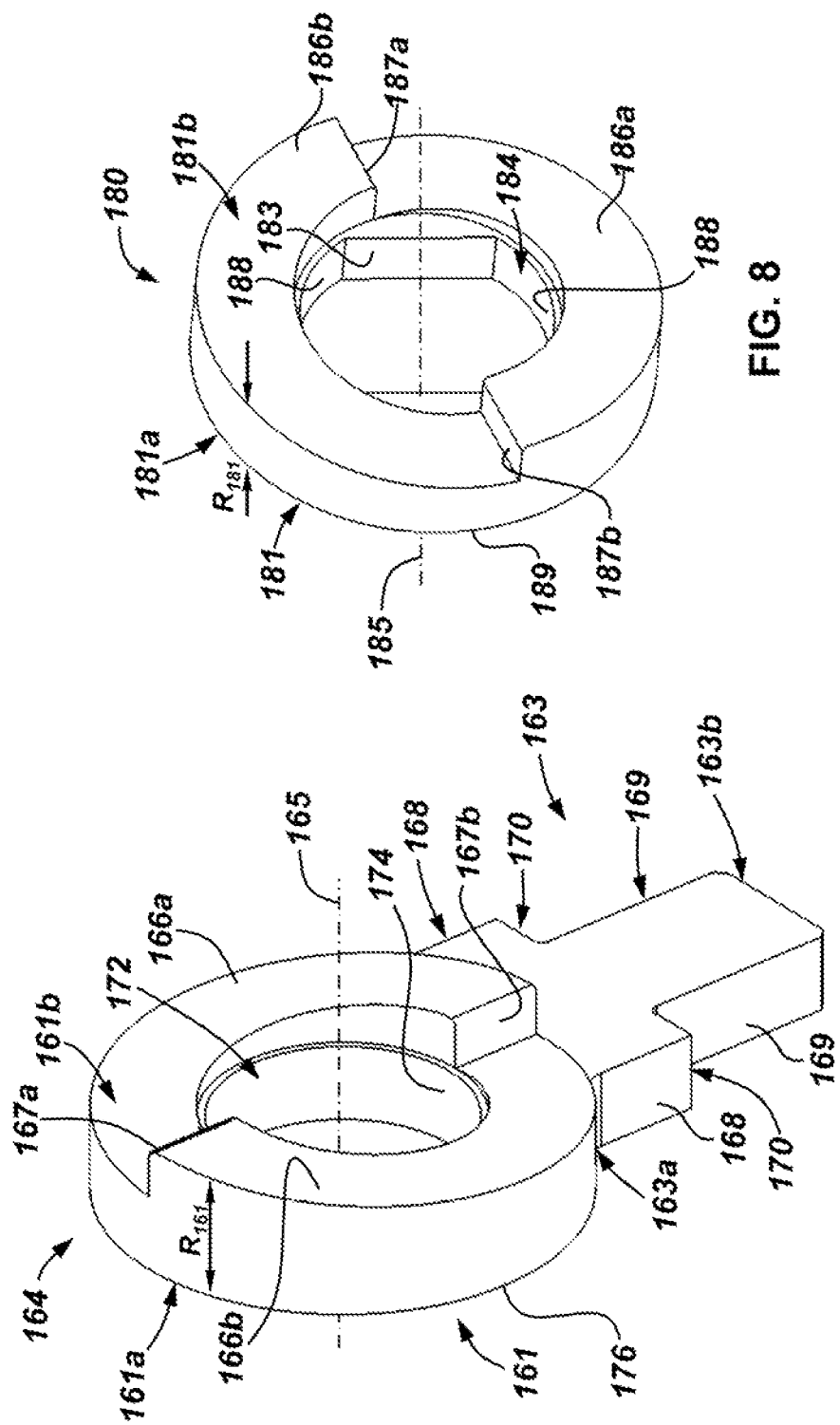

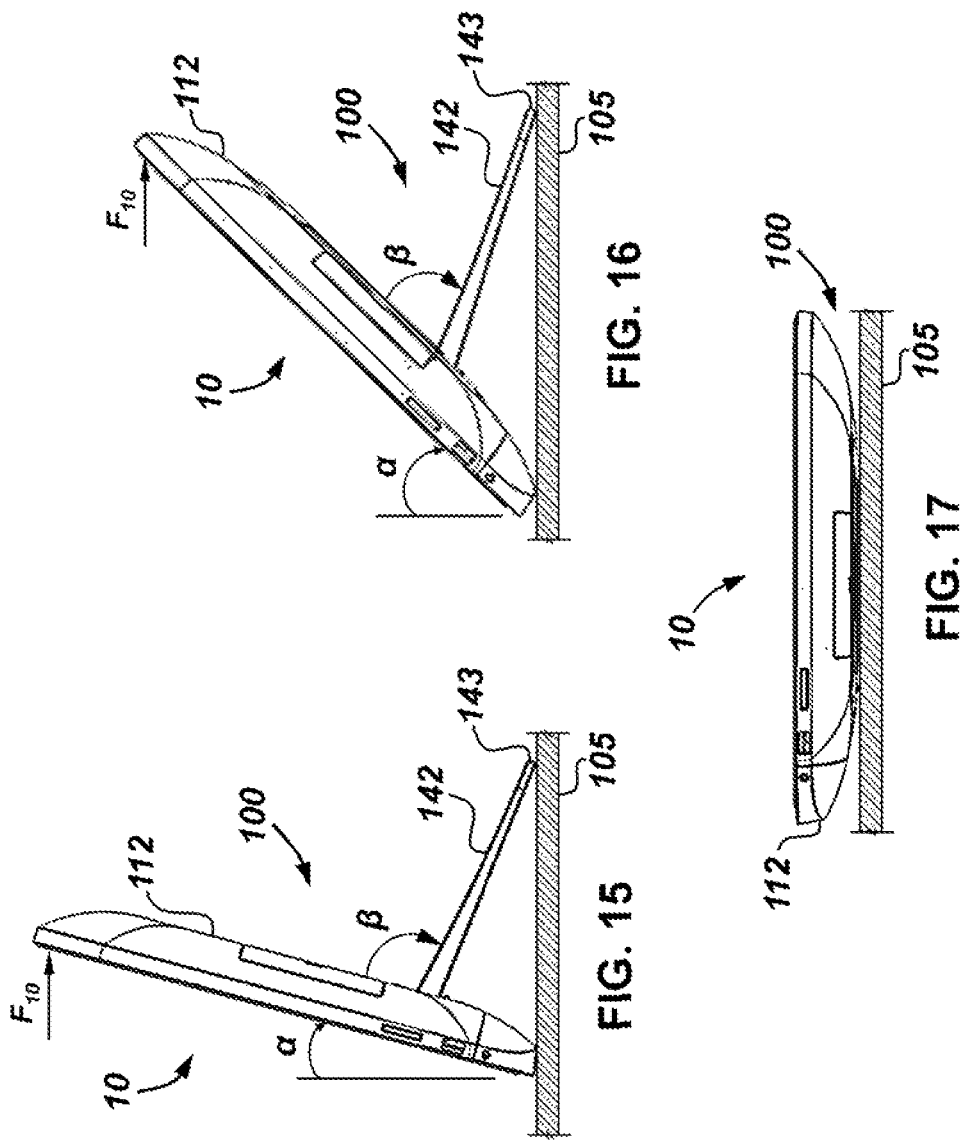

ELECTRONIC DISPLAY SYSTEM WITH A SUPPORT STAND

BACKGROUND

Electronic displays (e.g., computer screens) are often supported on a flat surface, such as a desk or table. Therefore, such displays also typically include some way of supporting with the display on the surface in order to prop up or orient the display relative thereto. Some displays are permanently installed on a stand or support device, such that the display is always supported by the stand. Additionally, some displays, such as those associated with tablet computers, may not include a stand or supporting device at all. Further, some computing devices, such as smartphones, include a rigid support stand which may be integral with the body of the device, but may only be deployed in either a retracted or extended position.

BRIEF DESCRIPTION OF THE DRAWINGS

For a detailed description of various examples, reference will now be made to the accompanying drawings in which:

FIG. 7 is a perspective view of one of the corkscrew washers disposed within the variable friction assembly of FIG. 6 in accordance with the principles disclosed herein;

FIG. 8 is perspective view of one of the corkscrew washers disposed within the variable friction assembly of FIG. 6 in accordance with the principles disclosed herein;

FIGS. 15-17 are schematic, sequential side views of the of the electronics display of FIG. 1 transitioning between a deployed position and a stowed position.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be descriptive of that example, and not intended to intimate that the scope of the disclosure, including the claims, is limited to that example.

Figure 1:
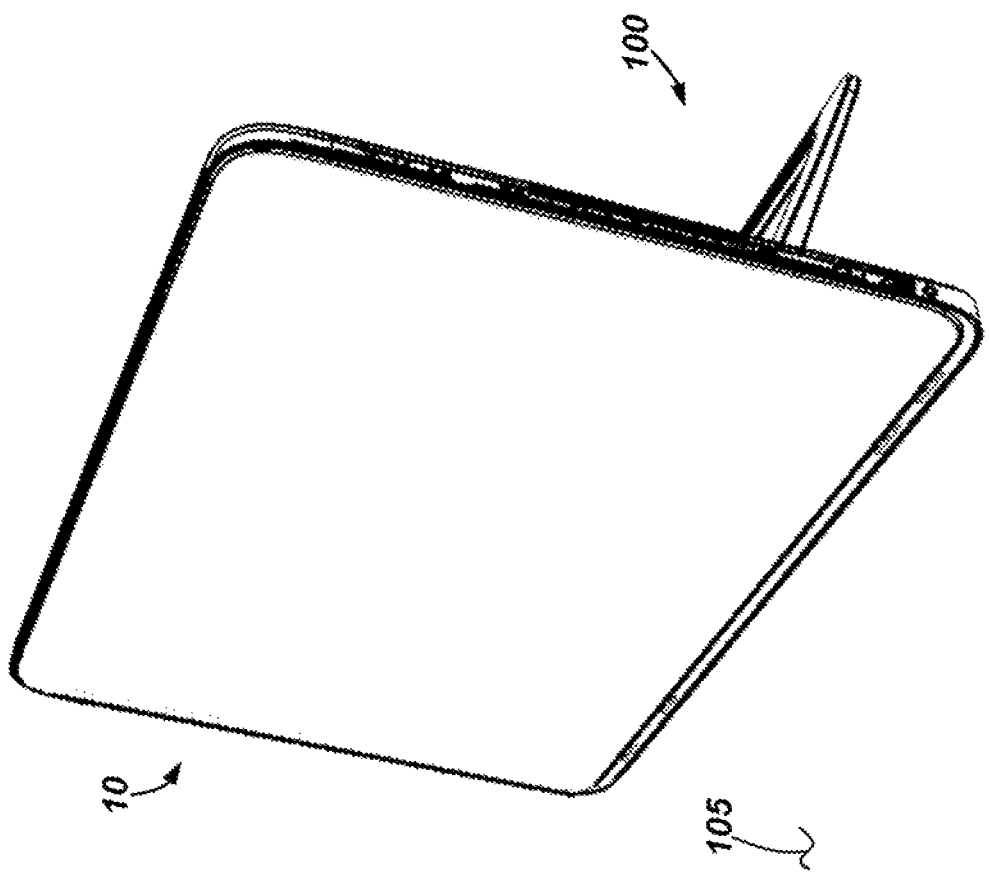
FIG. 1 is a perspective view of an electronic display with an adjustable support assembly in accordance with the principles disclosed herein.
Figure 2:
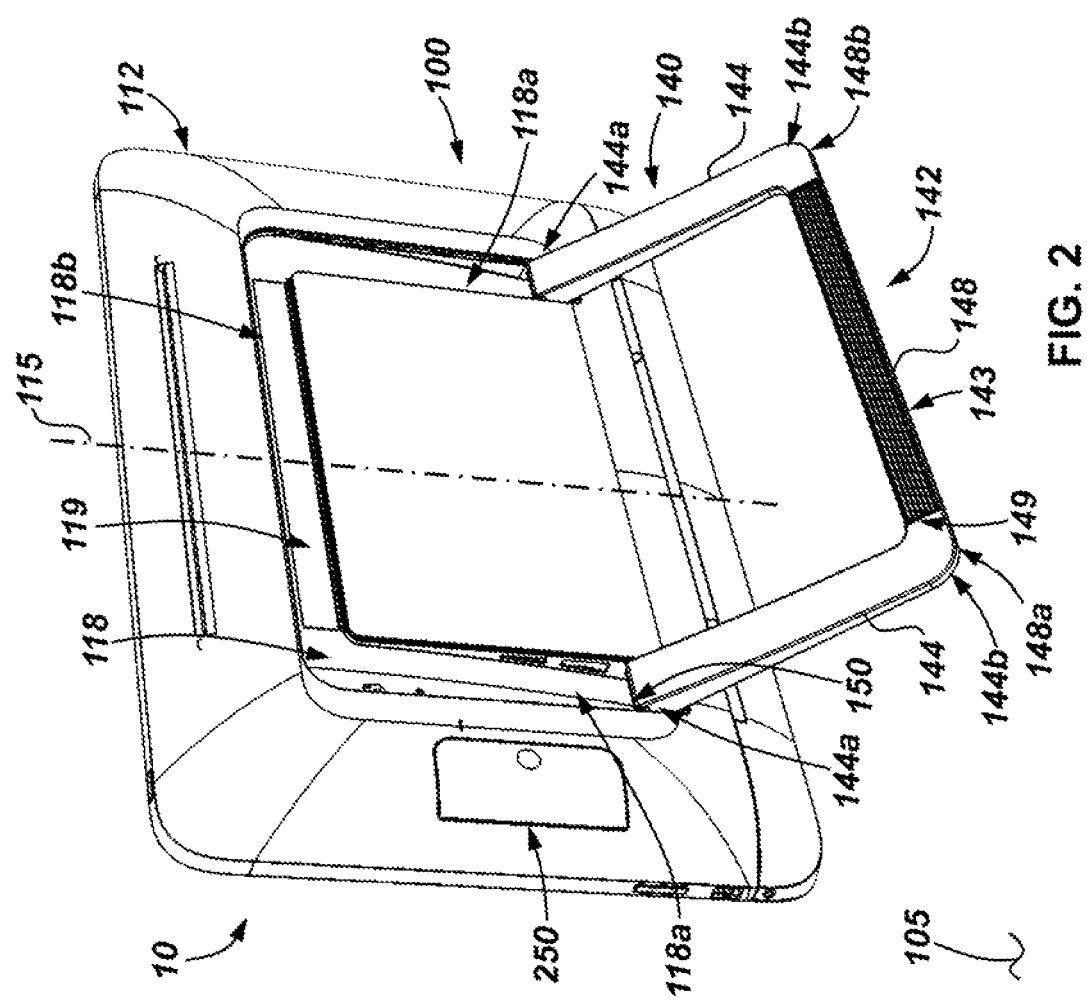
FIG. 2 is another perspective view of the electronics display of FIG. 1 with a kickstand fully deployed in accordance with the principles disclosed herein.
Figure 3:
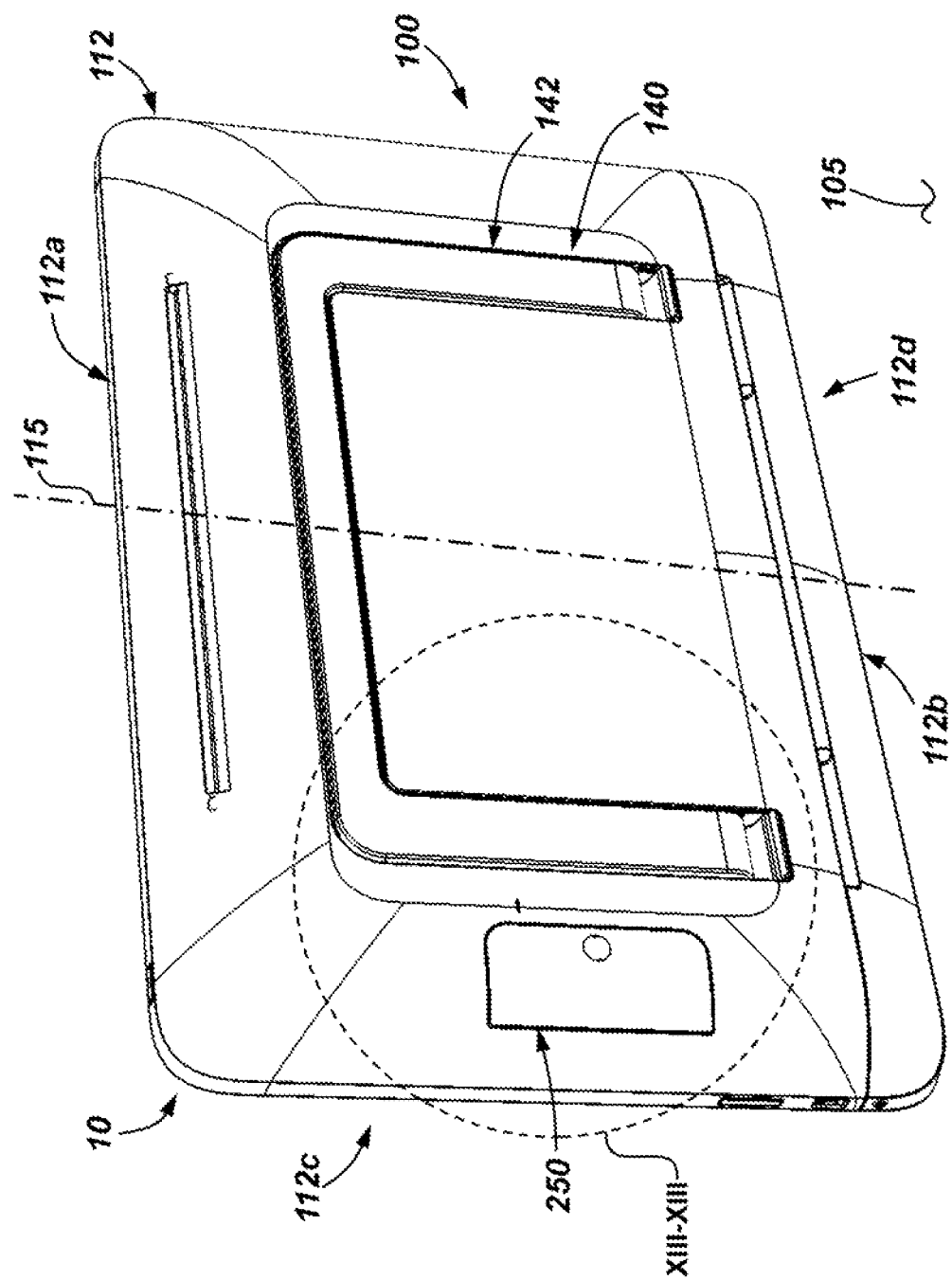
FIG. 3 is another perspective view of the electronics display of FIG. 1 with the kickstand fully retracted in accordance with the principles disclosed herein.

Referring now to FIGS. 1-3, wherein an electronic display system 10 with an adjustable support assembly 100 is shown disposed on a support surface 105. Display system 10 may be any suitable display for use with an electronic device. In some examples, display system 10 may be a screen or similar device for use with a computer while still complying with the principles disclosed herein. In other examples, display system 10 may be, among other things, a personal computer, an all-in-one computer, a point of sale device, a tablet, a scientific instrument, or a cellular phone. In those examples in which the display system 10 is an all-in-one computer, it should be appreciated that system 10 may further comprise a processor, memory, a hard drive, as well as other components which are typically included with such devices. In general, system 100 comprises a body or housing 112, a kickstand assembly 140, and a releasing assembly 250. Each of these components and assemblies will be described in more detail below.

It should be appreciated in some examples, the kickstand assembly 140 is integral with the body or housing 112 of the display system 10 such that the kickstand assembly 140 may be fully retracted therein to allow the display system 10 to be placed directly on the support surface 105. That is, in some example, in the fully retracted position, the kickstand assembly 140 may be completely inserted in a recess within the housing such that the back of the housing 112 appears flat and can lay substantially or completely flat on the support surface 105. Further, in some examples, the kickstand assembly 140 allows the user to adjust the angle of the display system 10 relative to the support surface 105 by simply applying a force the housing 112 itself. Thus, in these examples, there is no need to manually and directly manipulate the kickstand assembly 140 in order to achieve a desired angle between the display system 10 and the support surface 105.

Figure 4:
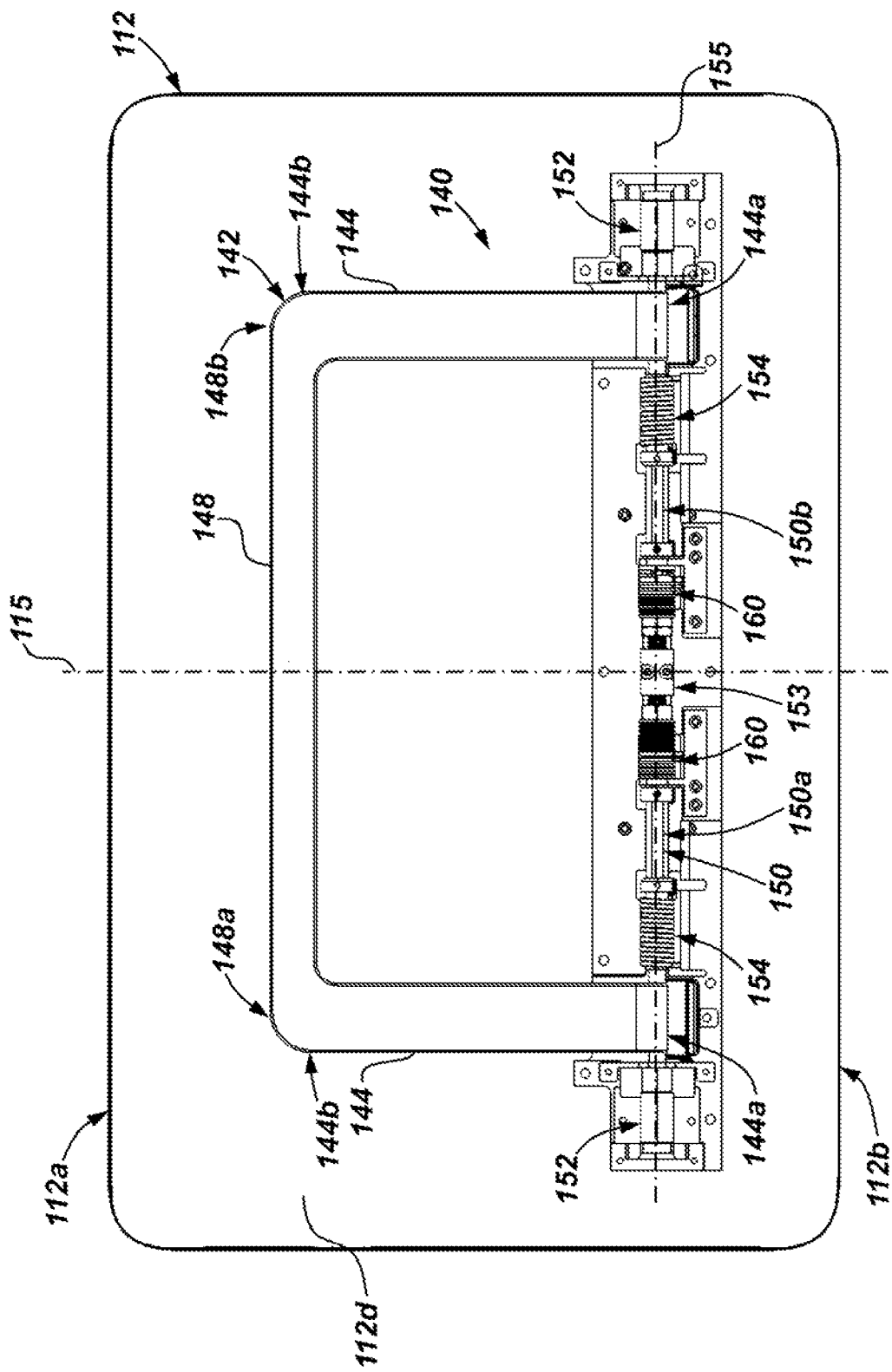
FIG. 4, is a rear view of the electronics display of FIG. 3 with the rear facing side of the housing removed, in accordance with the principles disclosed herein.

Referring now to FIGS. 2-4, housing 112 is generally rectangular shape and has a central axis 115, a first or upper end 112a, a second or lower end 112b, a generally front facing side 112c, and a generally rear facing side 112d. As will be described in more detail below, during operation, a user or operator views an image on the front facing side 112c, and orients the housing such that the upper end 112a is the uppermost end of the housing 112 and lower end 112b engages the surface 105. As is best shown in FIG. 2, housing 112 further comprises a substantially U-shaped recess 118 extending inward from the rear facing side 112d. Recess 118 further includes a pair of axially oriented lateral channels 118a, and a radially oriented channel 118b extending between the channels 118a. As will be described in more detail below, recess 118 is configured to house a kickstand 142 thus allowing a user or operator to lay or place the display system 10 substantially flat on the support surface 105 when the stand 142 is disposed within recess 118.

Still referring to FIGS. 2-4, kickstand assembly 140 generally comprises a kickstand 142, a pair of variable torque assemblies 154, and a pair of variable friction assemblies 160 (note: the assemblies 154, 160 are shown in FIG. 4). Kickstand 142 further includes a pair of elongate support members 144, and an elongate cross member 148. As used herein, the term "kickstand" refers to any suitable device or member that is retractable within a housing or body and supports less than all of the weight of the body or housing when deployed. Each of the members 144 includes a first or proximal end 144a and a second or distal end 144b opposite the proximal end 144a. The proximal end 144a of each of the members 144 is rotatably coupled to the housing 112, proximate the lower end 112b, via a shaft 150 (see FIG. 4), while each of the distal ends 144b extend outward from shaft 150. Cross member 148 generally includes a first end 148a and a second end 148b opposite the first end 148a, and generally extends between the members 144 such that one end 148a is coupled to the second end 144b of one of the members 144 while the other end 148b is coupled to the second end 144b of the other member 144 relative to housing 112. Thus, cross member 148 is generally oriented perpendicular to the axis 115 regardless of the orientation of the members 144. In this example, member 148 further includes a relatively smooth engagement surface 143 extending between the ends 148a, b. As will be described in more detail below, surface 143 slidingly engages the support surface 105 to allow a user or operator of display system 10 to alter the orientation of the kickstand 142 relative to housing 112 by simply pushing or pulling the housing 112. However, it should be appreciated that in other examples, no surface 143 is included while still complying with the principles disclosed herein. Furthermore, in this example, the members 144, 148 are all monolithically formed; however, it should be noted that in other examples, the members 144, 148 may not be monolithically formed while still generally complying with the principles disclosed herein.

The kickstand 142 may rotate about the shaft 150 in order to occupy a fully deployed position, as is shown in FIG. 2, and a fully retracted or stowed position, as shown in FIGS. 3 and 4. In particular, when the kickstand 142 is in the stowed position, as shown in FIG. 3, the kickstand 142 is received within the receptacle 118 such that the members 144 are received within the lateral channels 118a, and the member 148 is received within the channel 118b. Further, kickstand 142 may also occupy a number of arrangements and angles between the fully stowed position and the fully deployed positions, as will be described in more detail below.

Additionally, as is best shown in FIG. 2, in some examples, the channel 118b also includes a magnetic surface 119, and the member 148 further includes a metal plate 149. The material of plate 149 is selected such that it will be attracted to the magnetic surface 119 when plate 149 is placed in close proximity thereto. Thus in at least some examples, as the kickstand 142 is rotated to the stowed position, as shown in FIGS. 3 and 4, the surface 119 attracts plate 149 and thus secures the member 148 within the channel 118b. In some example, the magnetic surface 119 comprises rare earth magnets. Further, in some examples, the magnetic surface 119 may comprises a plurality of magnets, while in other examples, the magnetic surface 119 may only comprise one magnet.

Figure 5:
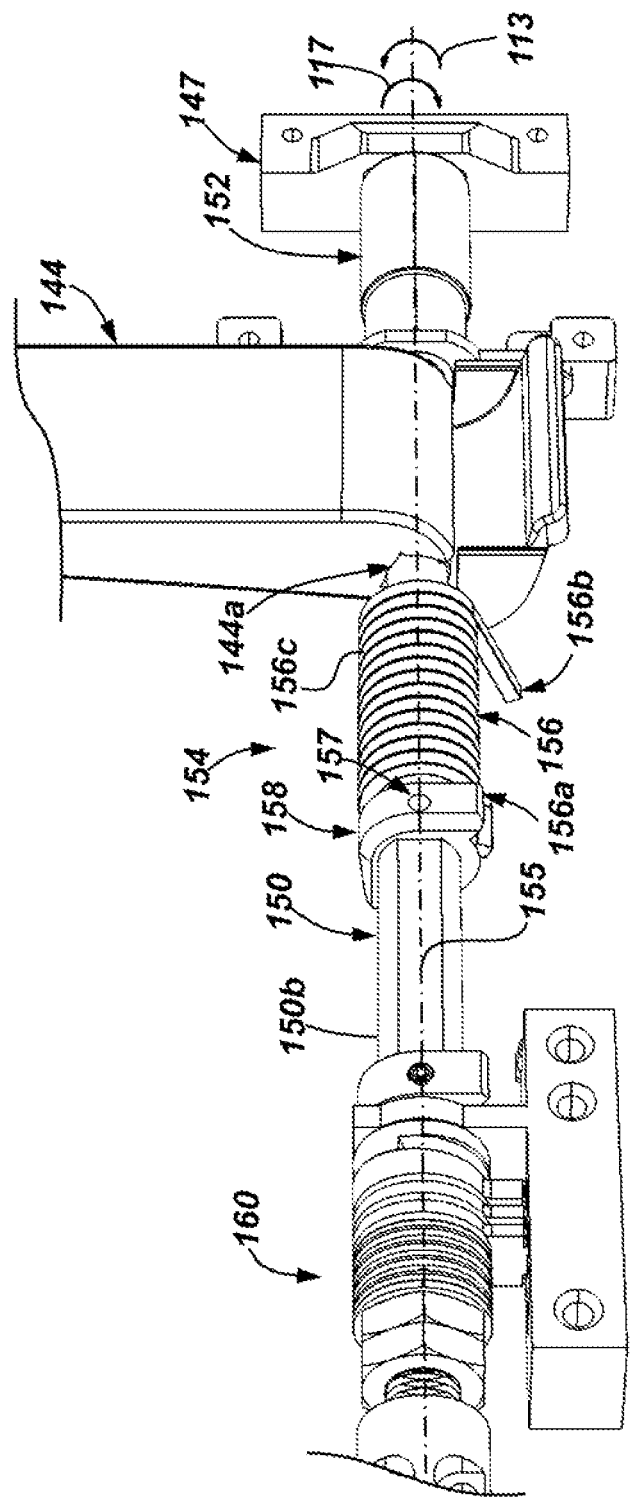
FIG. 5 is an enlarged perspective view of the hinged connection for the kickstand of the electronics display of FIG. 1 in accordance with the principles disclosed herein.

Referring now to FIGS. 4 and 5, in this example, shaft 150 comprises a rotational axis 155, a first shaft member 150a, and a second shaft member 150b, wherein the members 150a, b are substantially aligned with the axis 155. As is best shown in FIG. 4, the axis 155 is oriented such that it is substantially orthogonal or perpendicular to the axis 115. In this example, the members 150a, b are joined together by a coupling member 153 disposed along the axis 115. Thus, the members 150a and 150b rotate in a one-to-one relationship with one another during operation. Further, in this example, each member 150a, b includes a variable friction assembly 160 and a variable torque assembly 154 disposed thereabout. As is best shown in FIG. 4, each of the members 150a, b is coupled to a rotary damper 152. As will be described in more detail below, rotary dampers 152 are each utilized to slow the rotation of kickstand 142 about the axis 155. In some examples, rotary damper 152 may be filled with a viscous fluid, such as, for example, an oil or a gel, which works to resist relatively quick rotations of shaft 150 about the axis 155. Also, in this example, each of the dampers 152 is secured within the housing 112 via a mounting bracket 147. In some examples, dampers 152 may comprise any suitable bi-directional, rotary damper such as, for example, those manufactured by ACE Controls International, Inc. located in Farmington, Mich.

Referring now to FIG. 5, in some implementations, each variable torque assembly 154 generally comprises a helically wound torsional spring 156 disposed about the shaft 150 (e.g., shaft member 150b as shown in FIG. 5). However, it should be appreciated that in other examples, any suitable device or member for exerting a variable level of torque on a rotational member (e.g., shaft 150), may be used in place of torsional spring 156 while still complying with the principles disclosed herein. It should be appreciated that the shaft members 150a, b, as well as the associated assemblies 154, 160 are arranged substantially the same about the axis 115. Thus, in the description below and in the associated Figures, only the assemblies 154, 160 disposed on the shaft member 150b will be described and shown; however, it should be appreciated that the description contained herein may be applied to also fully describe the assemblies 154, 160 disposed on the member 150a.

Spring 156 generally comprises a first end 156a, a second end 156b, and a body 156c extending between the ends 156a, b. As shown in FIG. 5, body 156c is helically disposed about the shaft 150 between the ends 156a, b. A locking member 158 is disposed about the shaft 150 and coupled to the first end 1516 of spring 156. Member 158 includes and internal throughbore that corresponds to the cross-section of the shaft 150, thus allowing, member 158 to rotate along with the shaft 150 about the axis 155. Further, member 158 includes a securing member 157 which fixes the relative position of the member 158 and the shaft 150. In some examples, the securing member 157 comprises a set screw; however, any suitable securing member or method may be used while still complying with the principles disclosed herein. Therefore, as kickstand 142 rotates from the deployed position (FIG. 2) to the stowed position (FIG. 3) or along the direction 113, the first end 156a of spring 156 is forced to rotate along with shaft 150 while the second end 156b remains fixed to the housing 112. Such relative rotation between the ends 156a, b causes spring 156 to unwind or loosen about the shaft 150 thereby causing spring 156 to exert an ever increasing torque on shaft 150 in a direction opposite the direction of rotation 113. Conversely as kickstand 142 rotates from the stowed position (FIG. 3) to the deployed position (FIG. 2) or along the direction of rotation 117, the spring 156 tightens about the shaft thereby causing spring to exert and ever decreasing torque on, shaft 150 in a direction substantially aligned with the direction 117. Thus, the torque exerted on the shaft 150 by the variable torque assembly 154 reaches a relative maximum when the kickstand 142 is in the fully stowed position shown in FIG. 3 and reaches a relative minimum when the kickstand 142 is in the fully deployed position as shown in FIG. 2.

In some examples, spring 156 may be pre-loaded to exert an increased level of torque on the shaft 150 during operation by adjusting the position of the locking member 158 about shaft 150. In particular, in some examples, the securing member 157 is loosened and the relative position of the locking member 158 with respect to the end 156a of spring 156 is adjusted to exert the desired level of pre-loading on the shaft 150 by the spring 156.

Figure 6:
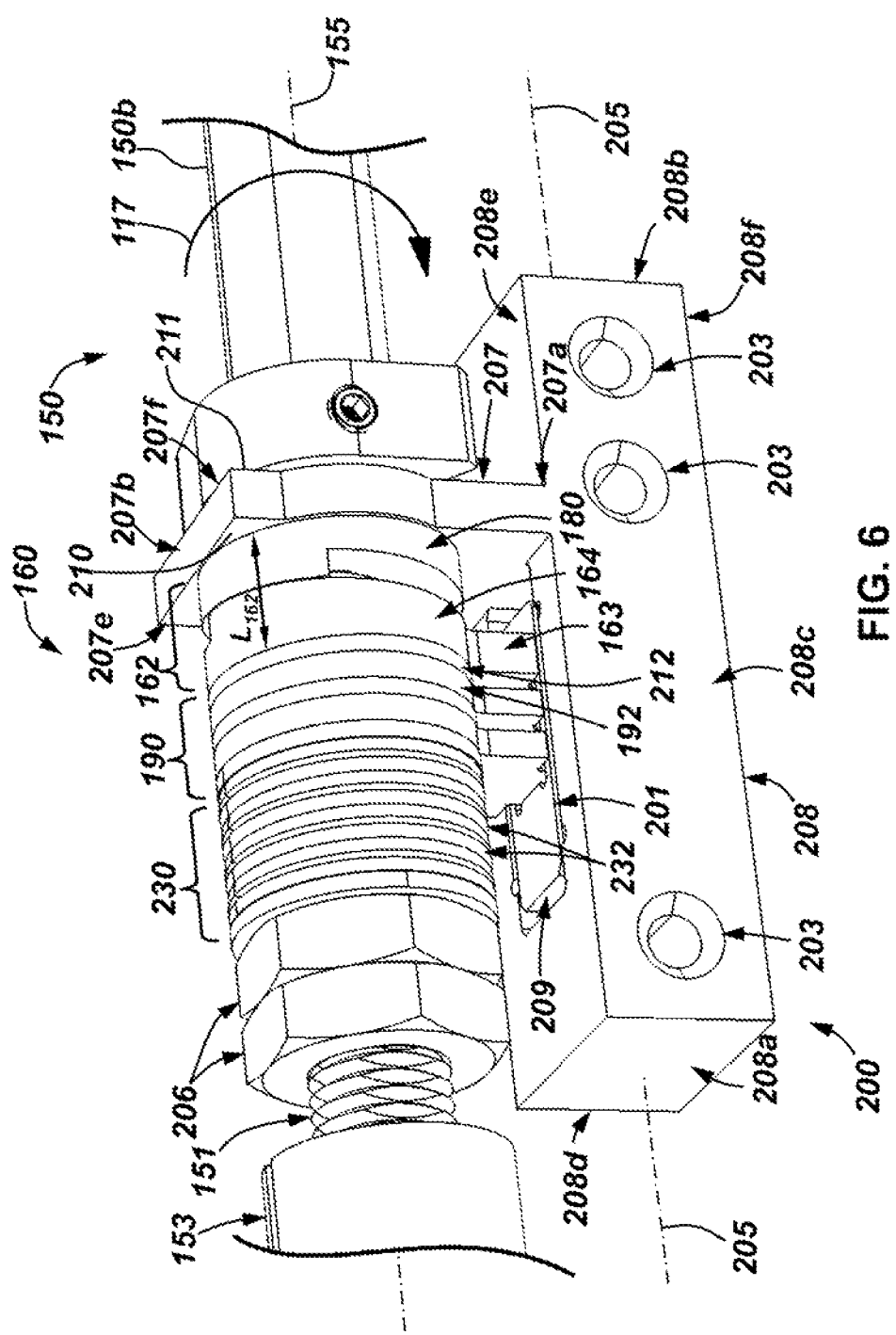
FIG. 6 is an enlarged perspective view of the variable friction assembly of the electronics display of FIG. 1 in accordance with the principles disclosed herein.

Referring now to FIGS. 5 and 6 variable friction assembly 160 is disposed about the axis 155 and generally comprises an expansion section 162, a friction production section 190, an axial pre-load section 230, and a cam or washer housing 200. Washer housing 200 is disposed proximate the shaft 150 and comprises a body 208 which further includes a central axis 205, a first or inner end 208a, a second or outer end 208b opposite the inner end 208a along the axis 205, a first or front side 208c, a second or rear side 208d opposite the front side 208c about the axis 205, a top 208e, and a bottom 208l opposite the top 208e about the axis 205. The end 208a is referred to herein as a "inner" end 208a because the end 208a is proximate the coupling member 153 and thus the central axis 115 of housing 112, while the end 208b is referred to herein as an "outer" end 208b because the end 208b is distal coupling member 153 and thus the axis 115 of housing 112. An elongate mounting slot 209 extends radially inward from the top 208e and is oriented along the axis 205 between the ends 208a, b. Further, a mounting saddle 201 is disposed within the slot 209 and as is described in more detail below, is arranged to house or receive a plurality of washers and slidingly engage and thus traverse along the slot 209 during operation. A radial projection 207 extends radially outward from the top 208e of housing 200, and generally includes a first or proximate end 207a, a second or distal end 207b, a first side 207e extending between the ends 207x, b, and a second side 207f extending between the ends 207a b. A throughbore (not shown) is disposed a the projection 207, extending between the sides 207e, f and substantially aligned with the axis 155 of shaft 150, such that it may receive the shaft member 150b during operation. The first side 207e further comprises a substantially planar surface 210, while the second side 207f comprises a substantially planar surface 211. A plurality of mounting apertures 203 are disposed on body 208 extending between the sides 208c, d. Apertures 203 are each configured to receive a securing member (not shown) to mount or secure body 208 within housing 112. The securing members may be any suitable device or member for mating or securing one component to another. For instance, the securing members may comprise screws, nails, bolts, nuts, or some combination thereof. Additionally, in some examples, housing 200 may be mounted within the housing 112 with an adhesive. In this example, three total securing apertures are included; however, in other examples, the number and arrangement of securing apertures 203 may vary greatly while still complying with the principles disclosed herein.

Referring now to FIGS. 6-8, expansion section 162 of variable friction assembly 160 further comprises a first or fixed corkscrew-style cam or washer 164 and a second or rotating corkscrew-style cam or washer 180 axially adjacent the fixed washer 164. Referring specifically to FIGS. 6 and 7, fixed washer 164 includes a shaft engagement section 161 and a housing engagement section 163. Section 161 further includes a central axis 165 that is substantially aligned with the axis 155 of shaft 150 during operation, a first side 161a, a second side 161b opposite the first side 161a, and an axial thickness $R_{161}$ measured between the sides 161a, b. A throughbore 172 extends between the sides 161a, b, and is generally defined by a substantially smooth cylindrical surface 174 that slidingly engages the shaft 150 during operation. The first side 161B comprises a substantially planar surface 176 that, as is described in more detail below, is configured to engage with corresponding planar surfaces disposed on adjacent washers within the variable friction assembly 160 (e.g., washer 212, described below).

The second side 161b comprises a pair of ramped surfaces 166a, b Each of the surfaces 166a, b is angularly disposed approximately 180° from the other and extends circumferentially about the axis 165. Additionally, each of the surfaces 166a, b is inclined and therefore also extends axially outward while moving circumferentially about the axis 165. Thus, the surfaces 166a, b may also be referred to herein as "helical" surfaces 166a, b. A pair of axially oriented substantially planar surfaces 167a, b is also disposed on the second side 161b. Each surface 167a, b extends between the helical surfaces 166a, b, and each is angularly disposed approximately 180° from the other about the axis 165.

Because helical surfaces 166a, b extend both circumferentially and axially with respect to the axis 165, as previously described, the radial thickness $R_{161}$ varies about the circumference of section 161. In particular, the radial thickness 161 generally increases when moving circumferentially along the surface 166a from the surface 167a to the surface 167b, and also generally increases when moving circumferentially along the surface 166b from the surface 167b to the surface 167a. Further, in some examples, the rate of increase of the radius $R_{161}$ when moving along either the surface 166a or 166b is substantially linear; however, it should be appreciated that, in other examples, the rate of increase of the radius $R_{161}$ may not be linear while still complying with the principles disclosed herein.

Housing engagement section 163 extends substantially radially outward from the section 161 and generally comprises a first or proximate end 163a and a second or distal end 163b opposite the proximate end 163a. A pair of parallel, substantially planar surface 168 extend radially outward from the proximate and 163a, while a pair of parallel, substantially planar surface 169 extending radially inward from the distal end 163b. Further, an axially oriented shoulder 170 generally extends between each of the surfaces 168, 169. As is best shown in FIG. 6, section 163 is received within the mounting slot 209 such that the shoulders 170 abut the radially upper end of the mounting saddle 201. Because, the housing 200 is mounted within the housing 112, via the securing apertures 203, previously described, the washer 164 is also rotationally fixed relative to the housing 112 via the engagement between the housing engagement section 163 and the slot 209, and thus does not rotate with the shaft member 150b about the axis 155.

Referring specifically to FIGS. 6 and 8, rotating washer 180 comprises a body 181 that further includes a central axis 185 that is aligned with the axis 155 of shaft 150 during operation, a first side 181a, a second side 181b opposite the first side 181a, and an axial thickness $R_{181}$ measured between the sides 181a, b. A substantially D-shaped throughbore 184 extends between the sides 181a, b, and is generally defined by a pair of substantially curved surfaces 188 and a pair of substantially planar surfaces 183. Each of the surface 188 are angularly disposed approximately 180° from one another about the axis 185, while each of the surfaces 183 are also angularly disposed approximately 180° from one another about the axis 185. Further, each of the surfaces 188 generally circumferentially extends between the surfaces 183. During operation, the surfaces 183 engage with corresponding planar surfaces on the outer surface of shaft 150. Thus, as shaft 150 rotates about the axis 155, the washer 180 also rotates about the axis 155.

The first side 181a generally comprises a substantially planar surface 189 that, as is described in more detail below, is configured to slidingly engage with the surface 210 on projection 207 of housing 200 during operation. The second side 131b comprises a pair of ramped substantially planar surfaces 186a, b. Each of the surfaces 186a, b is angularly disposed approximately 180° from the other and extends circumferentially about the axis 185. Additionally, each of the surfaces 186a, b is ramped and thus also extends axially outward while moving circumferentially about the axis 185. Thus, the surfaces 186a, b may also be referred to herein as "helical" surfaces 186a, b. A pair of axially oriented substantially planar surfaces 187a, b is also disposed on the second side 181b. Each surface 187a, b extends between the helical surfaces 186a, b, and each is angularly disposed approximately 180° from the other about the axis 185.

Because helical surfaces 186a, b extend both circumferentially and axially with respect to the axis 185, as previously described, the radial thickness $R_{181}$ varies about the circumference of section 181. In particular, the radial thickness $R_{181}$ generally increases when moving circumferentially along the surface 186a from the surface 187a to the surface 187b, and also generally increases when moving circumferentially along the surface 186b from the surface 187b to the surface 137a. Further, in some examples, the rate of increase of the radius $R_{181}$ when moving along either the surface 186a or 186b is substantially linear; however, it should be appreciated that, in other examples, the rate of increase of the radius $R_{181}$ may not be linear while still complying with the principles disclosed herein.

Referring briefly again to FIGS. 6-8, as previously described, the washers 164, 180 are axially adjacent one another along the shaft 150. Thus, expansion section 162 has an axial length $L_{162}$ measured between the surface 176 of the washer 174 and the surface 189 of the washer 180. As will be described in more detail below, when the shaft 150 rotates about the axis 155, the surfaces 166a, 166b on washer 164 engage with the surfaces 186a, 186b, respectively, of washer 180. As a result, as the shaft 150 rotates about the axis 155, the axial length $L_{162}$ increases or decreases depending on the direction of rotation.

Figure 10:
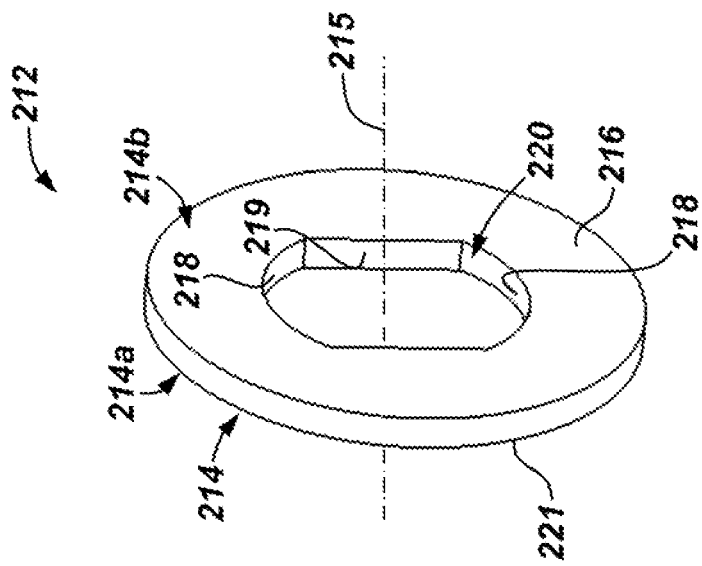
FIG. 10 is a perspective view of one of the rotating friction washers of the variable friction assembly of FIG. 6 in accordance with the principles disclosed herein.
Figure 9:
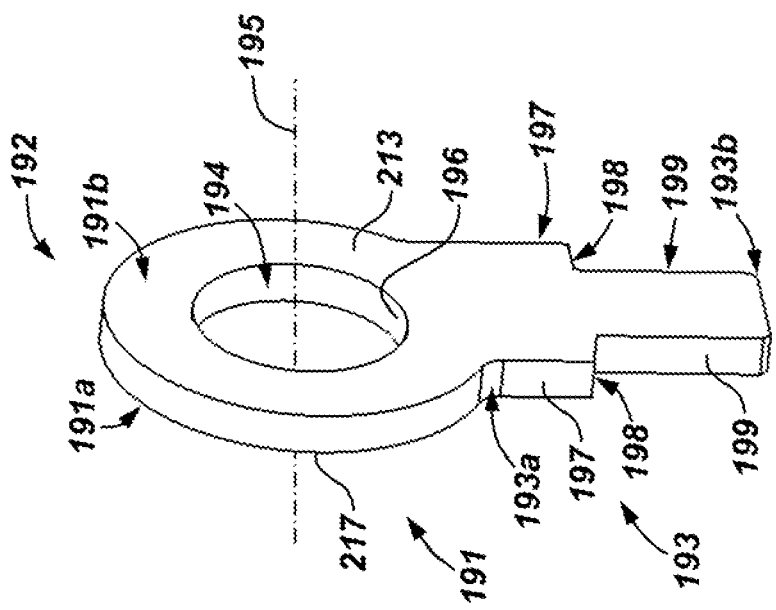
FIG. 9 is a perspective view of one of the fixed friction washers of the variable friction assembly of FIG. 6 in accordance with the principles disclosed herein.

Referring now to FIGS. 6, 9, and 10, friction production section 190 comprises a plurality of rotating friction cams or washers 212 and a plurality of fixed friction cams or washers 192 arranged about the shaft 150. Referring specifically to FIGS. 6 and 9, each of the fixed friction washers 192 comprises a shaft engagement section 191 and a housing engagement section 193. Section 191 further comprises a central axis 195 that is aligned with the axis 155 of shaft 150 during operation, a first side 191a, and a second side 191b opposite the first side 191a. A throughbore 194 extends between the sides 191a, b, is generally aligned with the axis 195 and defined by a substantially cylindrical surface 196. The first side 191a comprises a substantially planar surface 217, while the second side 191b comprises a substantially planar surface 213. Section 193 extends radially outward from the section 191 and comprises a first or proximate end 193a and a second or distal end 193 opposite the proximate end 193a. A pair of parallel, substantially planar surface 197 extend radially outward from the proximate end 193a, while a pair of parallel, substantially planar surface 199 extending radially inward from the distal end 193b. Further, an axially oriented shoulder 198 generally extends between each of the surfaces 197, 199. As is best shown in FIG. 6, section 193 is received within the mounting slot 209 such that the shoulders 199 abut the radially upper end of the mounting saddle 201. Because, the housing 200 is mounted within the housing 112, via the securing apertures 203, previously described, and the saddle 201 is rotationally fixed within the slot 209, the washers 192 are then also rotationally fixed relative to the housing 112 via the engagement between the housing engagement section 193 and the saddle 201. Thus, the washers 192 do not rotate with the member 150b about the axis 155 during operation.

Referring specifically to FIGS. 6 and 10, each of the rotating friction washers 212 comprises a body 214 which further includes a central axis 215 that is aligned with the axis 155 of shaft 150 during operation, a first side 214a, a second side 214b opposite the first side 214a, and a substantially D-shaped throughbore 220 aligned with the axis 215 and extending between the ends 214a, b. Throughbore 220 is substantially defined by a pair of substantially curved surfaces 218 and a pair of substantially planar surfaces 21g. Each of the surface 218 are angularly disposed approximately 180° from one another about the axis 215, while each of the surfaces 219 are also angularly disposed approximately 180° from one another about the axis 215. Further, each of the surfaces 218 generally circumferentially extends between the surfaces 219. During operation, the surfaces 219 engage with corresponding planar surfaces on the outer surface of shaft 150. Thus, as shaft member 150b rotates about the axis 155, the washers 212 also rotate about the axis 155. Additionally, the first side 214a comprises a substantially planar surface 221, while the second side 214b comprises a substantially planar surface 216. As will described in more detail below, the surfaces 221, 216 contact and slidingly engage the surfaces 217, 213 of axially adjacent fixed friction washers 192 within section 190. Additionally, at least one of the surfaces 221, 216 of one of the washers 212 engages with the surface 176 of washers 164 during operation. Further, at least one of the surfaces 221, 216 of one of the washers 212 engages a corresponding surface on one of the washers disposed within the pre-load section 230 (described below).

Figure 11:
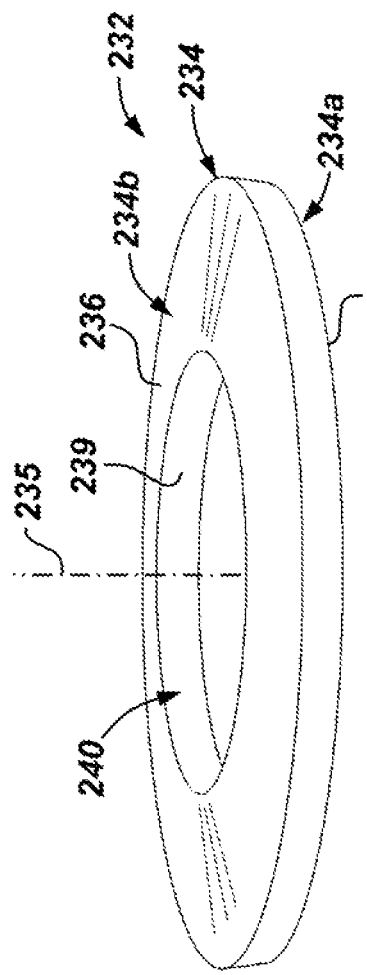
FIG. 11 is a perspective view of one of the washers of the pre-load section of the variable friction assembly of FIG. 6 in accordance with the principles disclosed herein.
Figure 12:
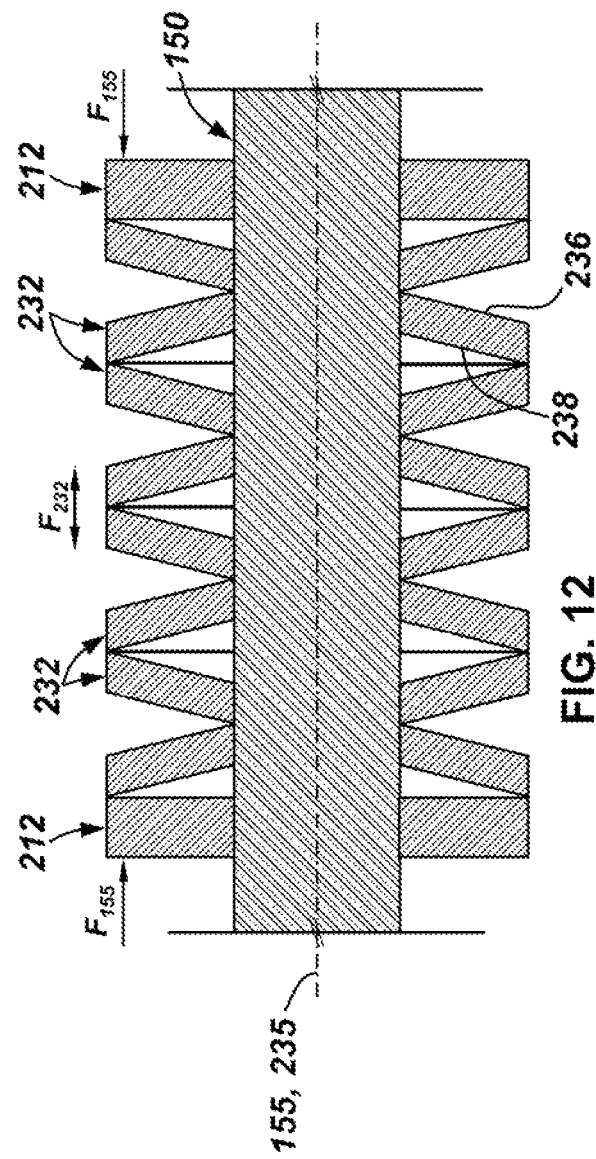
FIG. 12 is a partially schematic side cross-sectional view of the pre-load section of the variable friction assembly of FIG. 6 in accordance with the principles disclosed herein.

Referring now to FIGS. 6, 11, and 12, pre-load section 230 generally comprises a plurality of axial biasing or spring washers 232 arranged about the shaft 150. As is best shown in FIG. 11, each washer 232 comprises a body 234 which further includes a central axis 235 which is aligned with the axis 155 of shaft 150 during operation, a first side 234a, and a second side 234b opposite the first side 234a. A throughbore 240 extends between the sides 234a, b, along the axis 235, and is generally defined by an axially oriented substantially cylindrical surface 239. The first side 234a further comprises an axially facing substantially frustoconical surface 238, while the second side 234b comprises an axially facing substantially frustoconical surface 236.

Referring specifically now to FIG. 12, in some examples, the plurality of washers 232 is disposed on the shaft member 150b such that the surface 239 slidingly engages the shaft 150. In particular, the washers 232 are arranged such that the surface 236 of one washer 232 contacts or engages the surface 236 of an axially adjacent washer 232 and the surface 238 of one washer 232 contacts or engages the surface 238 of another axially adjacent washer 232. Further, in this example, section 230 includes two rotating washers 212 previously described arranged on opposite axial ends of section 230. When section 230 is compressed axially with a force $F_{155}$, which drives the corresponding surfaces 238, 236 of axially adjacent washers 232 into engagement with one another, a reactionary or spring force $F_{232}$ is exerted along the axis in the opposite direction of the compressive force $F_{155}$. Thus, section 230 behaves similar to a coiled spring placed under a compressive load. Therefore, in other examples, section 230 comprises a coiled spring disposed about the shaft 150 while still complying with the principles disclosed herein.

Referring again to FIG. 6, in this example, a pair of locking members 206 are threadably engaged with external threads 151 disposed on shaft 150. In particular, members 206 are disposed about shaft 150 axially between the coupling member 153 and the pre-load section 230. Therefore, during operation, the locking members 206 may be rotated about the axis 155 in order to compress the sections 230, 190, and 162 against the surface 210 of projection 207. The compression provided by locking members 206 give rise to a reaction spring force in the pre-load section 230 (e.g., $F_{232}$) in the manner previously described, and effectively drives the surfaces 217, 213 of the washers 192 into engagement with the surfaces 221, 216 of axially adjacent washers 212 of the friction production section 190. Further, the axially compressive load exerted by the locking members 206 as well as the reaction spring force generated in the pre-load section drive the helical surfaces 166a, b of the washer 164 into engagement with the helical surfaces 186a, b of the washer 180.

Thus, as the shaft 150 is rotated about the axis 155, the washer 180 rotates with the shaft member 150b while the washer 164 remains rotationally fixed with respect to the shaft member 150b. Additionally, as the washer 180 rotates relative to the washer 164 the surface 166b slidingly engages with the surface 166b circumferentially along the direction 117 between the surfaces 167a and 187a, while the surface 186a slidingly engages with the surface 166a circumferentially along the direction 117 between the surfaces 167b and 187b. Further, as shaft 150 rotates about the axis 155 along the direction 117, the surfaces 167a, 187a and the surfaces 167b, 187b move circumferentially away from one another. Due to the helical shape of the surfaces 166a, 166b, 186a, 186b, as the surfaces 167a, 187a and the surfaces 167b, 187b move circumferentially away from one another the axial length $L_{162}$ decreases. Conversely, as the shaft 150 is rotated about the axis 155 opposite the direction 117, the surfaces 167a, 187a and the surfaces 1671, 187b move circumferentially toward each other, thus increasing the axial length $L_{162}$. As the axial length $L_{162}$ increases and/or decreases in the manner described above, the saddle 201 slidingly engages the slot 209 and thus moves along the axis 205 within housing 200 in order to accommodate the varying axial length $L_{162}$.

Further, as the axial length $L_{162}$ increases or decreases, the engagement between the surfaces 217, 213 of the washers 192 and the surfaces 221, 216 of the washers 212 of friction production section 190 is increased or decreased, respectively. As the engagement between the surfaces of the axially adjacent washers 192, 212 increases, the amount of friction between the surfaces 217, 213, 221, 216 increases which thus resists continued rotation of the washers 212 relative to the washers 192 about the axis 155 and thereby resists the overall rotation of the shaft 150. Conversely, as the engagement between the surfaces of the axially adjacent washers 192, 212 decreases, the amount of friction between the surfaces 217, 213, 221, 216 also decreases which thus more freely allows the washers 212 to rotate relative to the washers 192 and thereby more freely allows the shaft 150 to rotate about the axis 155. Therefore, as the shaft 150 rotates about the axis 155 along the direction 117, the friction exerted by the friction production section 190 on the shaft member 150b decreases. Further, as the shaft 150 rotates about the axis 155 opposite the direction 117, the friction exerted by the friction production section 190 on the shaft member 150b increases.

Figure 13:
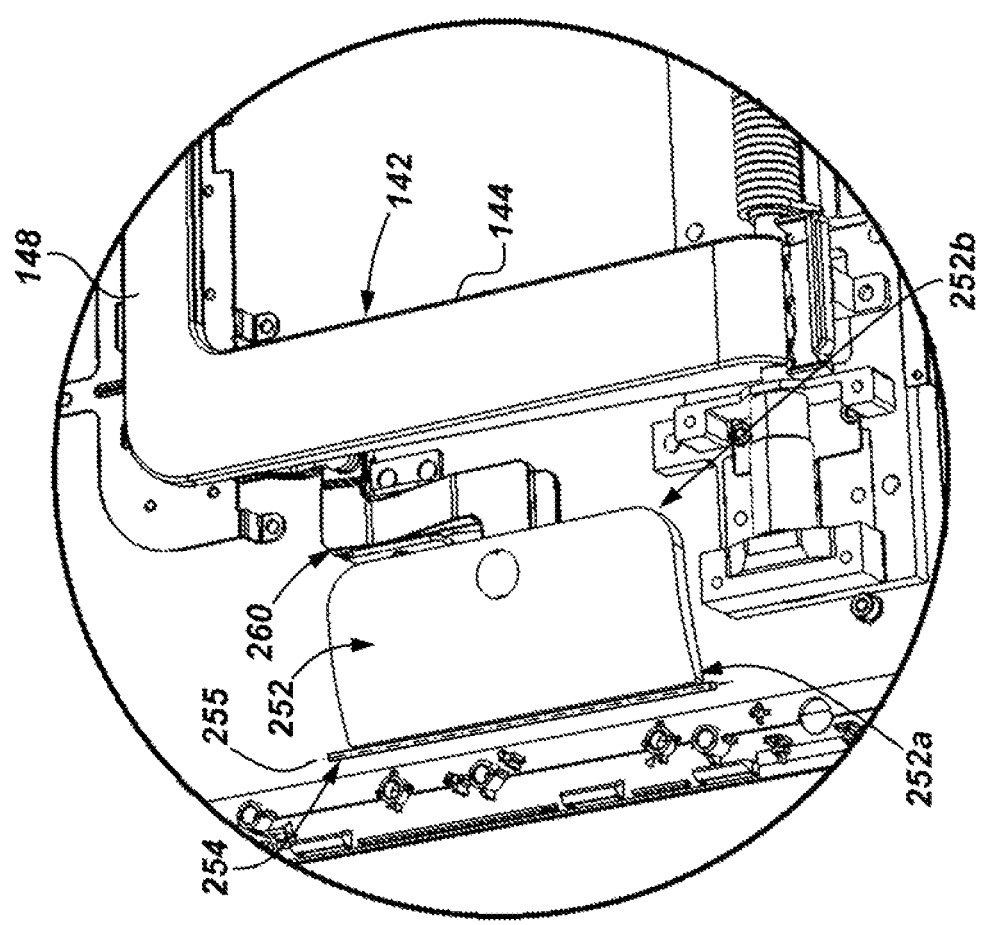
FIG. 13 is an enlarged perspective view of section XIII-XIII of FIG. 3 with the rear facing side of the housing removed in accordance with the principles disclosed herein.
Figure 14:
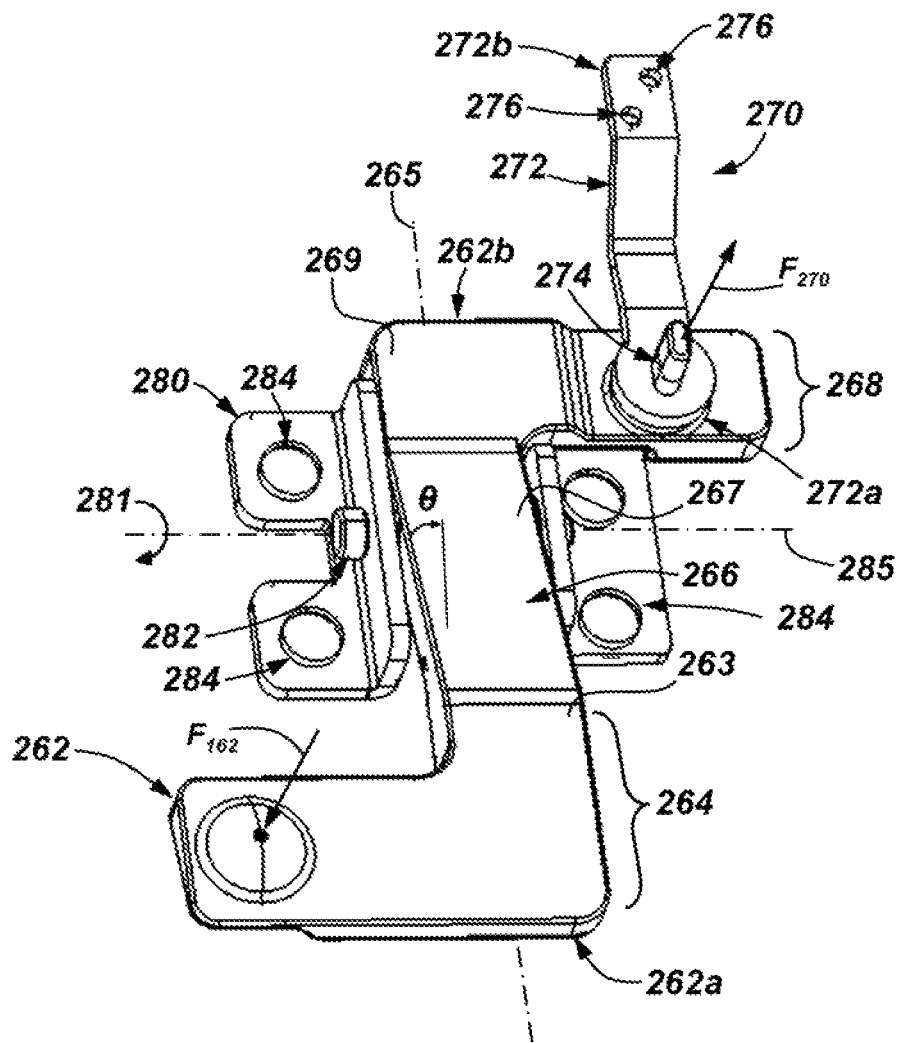
FIG. 14 is an enlarged perspective view of the releasing assembly of the electronics display of FIG. 1 in accordance with the principles disclosed herein.

Referring now to FIGS. 3, 13, and 14, wherein the releasing assembly 250 is shown. Releasing assembly 250 generally comprises an actuating member 252 and a rocker arm assembly 260. Actuating member 252 further includes a first end 252a and a second end 252b opposite the first end 252a. The first end 252 is coupled to the housing 112 via a hinge 254 oriented along a rotational axis 255. Therefore, second end 252b may be rotated about the axis 255 of hinge 254 during operation.

Referring specifically now to FIG. 14, rocker arm assembly 260 generally comprises a central axis 265, a generally S-shaped rocker arm 262, and a mounting bracket 280. Rocker arm 262 further comprises a first end 262a, a second end 262b, a first or user engagement section 264 extending axially from the first end 262a, a second or stand engagement section 268 extending axially from the second end 262b, and a third or angled section 266 extending generally axially between the sections 264, 268. The section 264 comprises a substantially planar surface 263, while the section 266 comprises a substantially planar surface 267 and the section 268 comprises a substantially planar surface 269. Further, the surface 266 is contiguous with each of the surfaces 263, 269 and is oriented at an angle θ with respect to the axis 265. Thus, the section 264 is disposed radially outward from the section 268.

A stand engagement assembly 270 is disposed on the arm 262 at the second end 262b, and generally includes an engagement arm 272 which further includes a first end 272a, and a second end 272b opposite the first end 272a. An engagement pin 274 extends from the arm 272 proximate the first end 272a in a direction that is substantially perpendicular to the axis 265. A pair of mounting apertures 276 extends substantially radially through arm 272 proximate the second end 272b. Each of the apertures 276 is arranged to receive a securing member (not shown) therethrough in order to secure arm 272 to a mounting surface (not shown) within housing 112. Further, as is shown in FIG. 14, the first end 272a is engages with the surface 269 on section 268 of arm 262.

The rocker arm 262 is mounted within the housing 112 via the mounting bracket 280. More specifically, bracket 280 includes a plurality of mounting apertures 284, which are each arranged to receive a securing member (not shown) in order to secure bracket 280 to a mounting surface (not shown) within housing 112. The securing members may be any suitable device or member for mating or securing one component to another. For instance, the securing members may comprise screws, nails, bolts, nuts, or some combination thereof. Additionally, in some examples, bracket 180 may be mounted on a surface (not shown) within the housing 112 with an adhesive. Arm 262 is rotatably mounted to bracket 280 via a shaft 282 oriented along an axis of rotation 285, thus allowing arm 262 to rotate about the axis 285 during operation. More particularly, as section 264 is forced radially inward in response to a force $F_{162}$, the arm 262 rotates about the axis 285 in a direction of rotation 281, thereby forcing section 268 radially outward. As section 268 is forced radially outward, the surface 269 engages with the arm 272 proximate the first end 272a and thus also forces the pin 274 upward.

Referring again to FIGS. 2, 3, 13, and 14, during operation, the kickstand 142 may be in the stowed position, as is shown in FIG. 13. Thus, in the stowed position, the member 148 is secured within the channel 118b via the attractive forces between the magnetic surface 119 and the metal plate 149. A user or operator (not shown) then depresses the actuating member 252, which rotates about the axis 255 and engages with the surface 263 which in turn rotates the arm 262 about the axis 285, thereby forcing the surface 269 and pin 274 upward. At the same time, pin 274 engages with the support member 144 of kickstand 142, proximate the end 144a, and thus forces kickstand 142 to rotate about the axis 155 of shaft 150 thereby disengaging the magnetic surface 119 from the plate 149. Once a sufficient distance has been achieved between the magnetic surface 119 and the plate 149, the torque exerted by the spring 156 within variable torque assembly 154 rotates the kickstand 142 about the axis 155 of shaft 150 toward the deployed position shown in FIG. 2. Thus, a user or operator needs only to depress the actuating member 252 in order to transition the kickstand from the stowed position to the fully deployed position. In other words, no manual manipulation of the kickstand 142 itself is necessary to transition the kickstand 142 from the stowed position as shown in FIG. 3 to the deployed position as shown in FIG. 2.

Referring now to FIGS. 2, 3, and 6, when kickstand 142 is in the stowed position, as shown in FIG. 3, the torque applied to shaft 150 by the variable torque assemblies 154 is at a relative maximum, as previously described. Additionally, the friction applied to the shaft 150 by the variable friction assemblies 160 is also at a relative maximum when the kickstand 142 is in the stowed position, as previously described. Conversely, when the kickstand 142 is in the fully deployed position, as shown in FIG. 2, the torque applied to the shaft 150 by the assemblies 154 and the friction applied to the shaft 150 by the assemblies 160 are both at a relative minimum as previously described. Thus, the torque applied by the assemblies 154 is effectively balanced to some degree by the friction applied by the assemblies 160 for any position of kickstand 142 between and including the stowed and deployed positions.

Additionally, the relative levels of torque and friction applied by the assemblies 154, 160, respectively, may also be designed, in some examples, to account for the relative weight of the display system 10 being directly supported by kickstand 142. In particular, as kickstand 142 nears the stowed position, as shown in FIG. 3, an ever increasing amount of the weight of display system 10 is being directly supported by the kickstand 142. Thus, the arrangement and/or properties of the springs 156 in the assemblies 154 as well as the arrangement and/or properties of the washers 232, 212, 194, 164, 180 of the assemblies 160 (e.g., profiles of the surfaces 166a, 166b, 186a, 186b, of the washers 164, 180) may be designed such that the assemblies 154, 160 exert a sufficient amount of torque and friction, respectively, on shaft 150 to counteract the applied weight of display system 10 and thereby maintain any given orientation of the kickstand 142 between the deployed and stowed positions. Additionally, in at least some examples, a user or operator may adjust the angle of the members 144 of kickstand 142 relative to the housing 112 by simply manipulating the housing 112. In particular, if a user wishes to decline the display system 10 relative to the support surface 105, he or she may simply push on the front facing side 112c of housing 112, thus forcing the kickstand 142 to rotate about the axis 155 in the direction 113, thereby increasing the levels of torque and friction applied by the assemblies 154, 160, respectively, such that the desired orientation of the kickstand 142, relative to the housing 112 is maintained. Conversely, if a user wishers to incline the display system 10 relative to the support surface 105, he or she may simply pull on the rear facing side 112d of the housing 112, thus allowing assembly 154 to force kickstand 142 to rotate about the axis 155 in the direction 117 via the torque applied by spring 156, until the kickstand 142 contacts the support surface 105. Once contact between the kickstand 142 and the surface 105 has be reinitiated, the friction supplied to the shaft 150 by the assembly 160 is sufficient to maintain the new orientation of the kickstand 142 relative to the housing 112.

Referring now to FIGS. 15-17, for a specific implementation of assembly 100, as kickstand 142 is rotated about the axis 155 such that the surface 143 disposed on kickstand 142 contacts support surface 105 along with the lower end 112b of housing 112, thus allowing kickstand 142 to at least partially support the weight of display 10 on surface 105. As is best shown in FIGS. 15 and 16, when kickstand 142 is deployed, it is oriented at an angle $\beta$ with respect to the housing 112, while the housing 112 is oriented at an angle $\alpha$ with respect to vertical. In some examples, $\beta$ may range from 0° to greater than 150° while $\alpha$ may range from approximately 0° to 90°. For example, in some implementations $\beta$ has a maximum value of 102.5° or 110°. Factors for determining the maximum value of $\beta$ include, for example, the size of the display 10, the location of the shaft 150, and the center of gravity of the display 10. Regardless, for any value of $\beta$ and corresponding value of a, the torque applied to the shaft 150 (not directly shown in FIGS. 15-17) by the variable torque assemblies 154, and the friction applied by the variable friction assemblies 160 effectively counteracts or balances the weight of display 10 that is being supported by the kickstand 142. More particularly, as the value of $\beta$ decreases and the value of $\alpha$ increases, the weight exerted by the display 10 on the kickstand 142 increases, while the torque and friction exerted by the assemblies 54 and 160 on the shaft 150 each also increases in the manner previously described, thus maintaining an approximate balance of forces about the shaft 150. Therefore, for any value of $\beta$ and corresponding value of $\alpha$, the kickstand 142 will maintain a given orientation with respect to the housing 112. Thus, to adjust the display 10 from a fully deployed position, as shown in FIG. 13, a user or operator may merely exert a force $F_{10}$ on the display 10 such that the weight experienced by the kickstand 142 is increased and thereby causing the angle $\beta$ to decrease, the angle $\alpha$ to increase, and the surface 143 to slidingly engage the surface 105. Once the application of force $F_{10}$ ceases, the kickstand 142 will maintain the resulting orientation of the housing 112.

Figure 18:
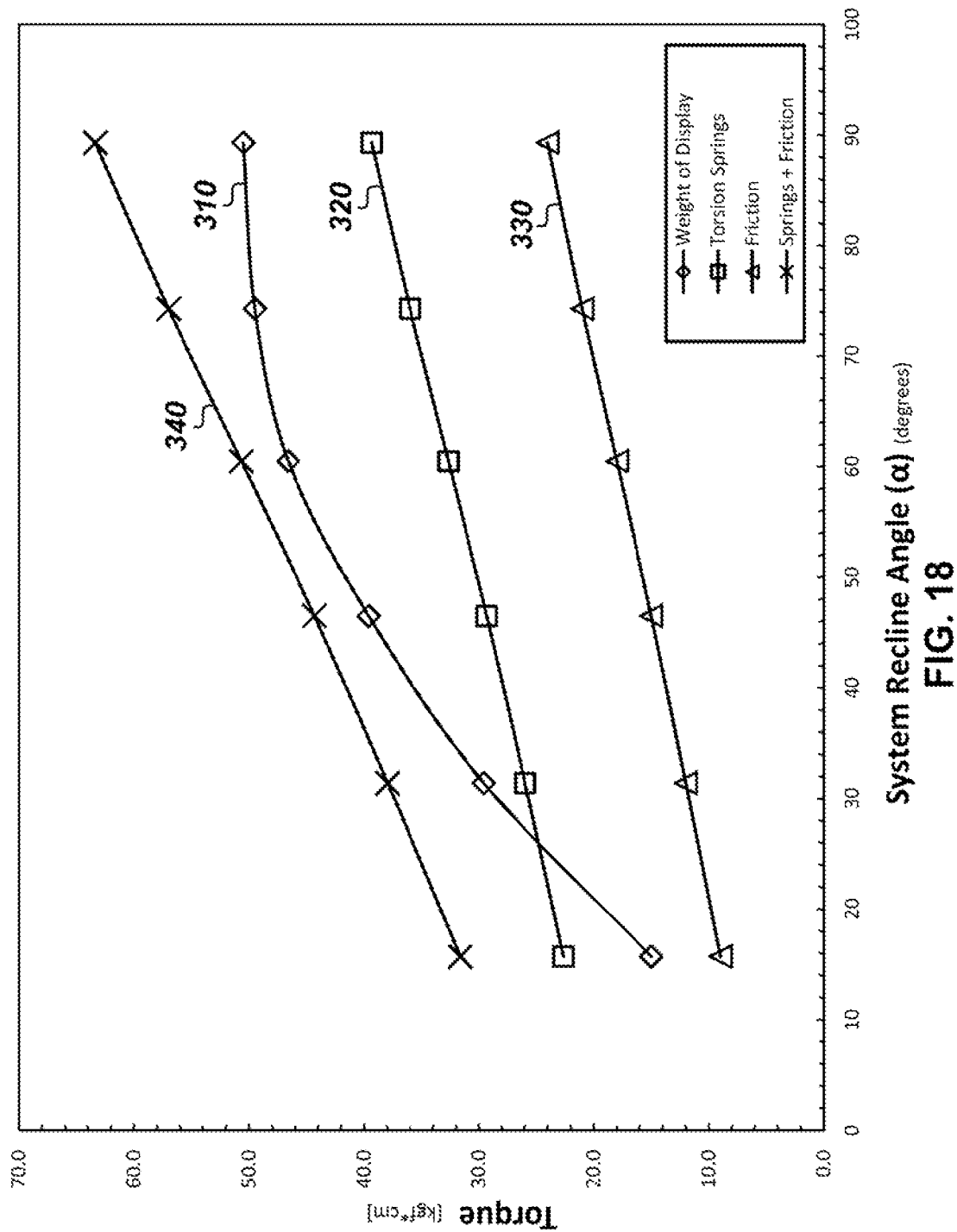
FIG. 18 is a chart representing the various contributions of torque applied to the shaft of the display of FIG. 1.

Referring now to FIG. 18, wherein a chart illustrating the components of torque applied to the shaft 150 for a specific implementation of the support assembly 100 over a range of values of the angle $\alpha$, previously described, is shown. First, the line 310 represents the amount of torque applied to the shaft 150 of assembly 100 by the weight of the display 10. Thus, as the angle $\alpha$ increases and the display 10 is rotated farther from vertical, the amount of torque applied to the shaft 150 by the weight of display 10 increases. In this example, the increase of line 310 is substantially sinusoidal in nature; however, other relationships are possible. In addition, the line 320 represents the amount of torque applied to the shaft 150 of assembly 100 by the variable torque assemblies 154, previously described. Thus, as the angle α increases, the torque applied by the assembly 154 increases. Further, the line 330 represents the amount of torque applied to the shaft 150 of assembly 100 by the variable friction assemblies 160, previously described. Thus, as the angle α increases, the torque applied by the assemblies 160 also increases. In this example, the increase of each of the lines 320, 330 is substantially linear in nature; however, other relationships are possible. Still further, the line 340 represents the combined torque applied to the shaft 150 by the assemblies 154 and 160 (lines 320 and 330, respectively). Therefore, because the lines 320 and 330 increase generally linearly as the angle α increases, the line 340 also increases generally linearly as the angle α increases. However, it should be appreciated that other relationships are possible while still complying with the principles disclosed herein.

Referring now to FIGS. 15-18, as previously described above, the weight of the display 10 applies a torque (line 310) to rotate the kickstand 142 toward the stowed position as shown in FIG. 17, while the assemblies 154 apply a torque (line 320) which opposes rotation of the kickstand 142 toward the stowed position. Further, assemblies 160 apply torque (line 330) which generally opposes the direction of rotation of the kickstand 142, and thus, apply a torque which also opposes rotation of the kickstand 142 toward the stowed position when the force $F_{10}$ is applied to the display 10 as previously described. Therefore, in some examples, the line 340 represents the amount of torque opposing the rotation of the kickstand 142 toward the stowed position (as shown in FIG. 17) when the force $F_{10}$ is applied to the display 10. Further, as is best shown in FIG. 18, the values making up the line 340 are generally greater than the values making up line 310 over the represented range of values for the angle α. Thus, the torque applied to the shaft 150 by the assemblies 154, 160 effectively counteracts the torque applied by the weight of the display 10 and allows the kickstand 142 to maintain any desired angle of α within the stated range.

Therefore, through use of an adjustable support assembly (e.g., assembly 100) in accordance with the principles disclosed herein, a user or operator of an electronic display (e.g., display system 10) may be able to adjust the angle of the display relative to a support surface (e.g., surface 105) in order to ensure a proper viewing angle without the need to manually manipulate the support mechanism. Additionally, through use of an adjustable support assembly in accordance with the principles disclosed herein, a user or operator of an electronic display may fully retract the support structure within the housing (e.g., housing 112) of the display in order to lie the display flat on the support surface.

While examples have be described and disclosed herein has including a shaft 150 comprising two members 150a, b, it should be appreciated that in other examples, shaft 150 may only comprise a single continuous member and no coupling member 153 may be included while still complying with the principles disclosed herein. Additionally, in some examples, only the member 150a or the member 150b of shaft 150 may be included. Also, while examples described and disclosed herein have shown two variable friction assemblies and two variable torque assemblies disposed on the shaft 150, in other examples, more or less than two variable friction assemblies and/or more or less than two variable torque assemblies may be disposed on shaft 150 while still complying with the principles disclosed herein. Further, while examples disclosed herein have described and disclosed the variable torque assemblies as including one torsional spring 156, in other examples, more than one torsional spring 156 may be included while still complying with the principles disclosed herein. Additionally, in some examples, torsional spring 156 may be replaced with any other suitable device for applying a varying level of torque on a shaft (e.g., shaft 150), while still complying with the principles disclosed herein. Still further, in some examples, no rotary dampers 158 may be disposed on the shaft 150 within the system 100 while still complying with the principles disclosed herein. Additionally, in some examples, the variable friction assembly or assemblies may apply a relative maximum and/or minimum of friction when the kickstand 142 is disposed between the stowed and deployed positions. Furthermore, in some examples, the variable torque assembly or assemblies may apply a relative maximum and/or minimum of torque when the kickstand 142 is disposed between the stowed and deployed positions. Further, while the washers 164, 180 of assembly 160 have been described as separate cams or washers which are coupled to the shaft 150, it should be appreciated that in other examples, the washer 164 and/or the washer 180 may comprise a portion of the housing 112 and/or shaft 150 while still complying with the principles disclosed herein.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic display system, comprising:
  a housing having a top side and a bottom side opposite the top side;
  a kickstand having an elongate member further including a first end and a second end opposite the first end, the first end being rotatably coupled to the housing proximate the bottom side thus forming an angle of rotation between the elongate member and the housing, and the second end being rotationally biased away from the housing; and
  a variable friction assembly to apply a variable level of friction to the first end to resist rotation of the kickstand about the first end; and
  a release assembly including an actuating member and a rocker arm, wherein the release assembly is to actuate the kickstand via the rocker arm in response to a depression of the actuating member;
  wherein the elongate member of the kickstand is rotatable from a first position in which the angle of rotation is approximately zero, to a second position in which the angle of rotation is greater than ninety degrees; and
  wherein the variable friction assembly is to apply an increasing level of friction to the first end as the angle of rotation decreases from the second position to the first position.

2. The electronic display system of claim 1, wherein the second end of the kickstand is rotationally biased with a variable torque assembly coupled to the first end to apply an increasing level of torque to the first end as the angle of rotation decreases from the second position to the first position.

3. The electronic display system of claim 2, wherein the increasing level of torque opposes the increasing level of friction about the first end.

4. The electronic display system of claim 2, wherein the first end of the kickstand is coupled to the housing with a hinge, the hinge further comprising a shaft.

5. The electronic display system of claim 4, wherein the variable torque assembly comprises a torsional spring; and wherein the variable friction assembly comprises a pair of corkscrew-style cams.

6. The electronic display of claim 5, wherein the torsional spring has a first end and a second end, the first end being rotationally fixed to the shaft and the second end being coupled to the housing; and wherein the first of the corkscrew-style cams is rotationally fixed to the shaft, and a second of the corkscrew-style cams is rotationally fixed to the housing.

7. The electronic display system of claim 6, wherein the first of the corkscrew-style cams includes a first helical surface; wherein the second of the corkscrew-style cars includes a second helical surface; and wherein the first and second helical surfaces engage one another.

8. The electronic display system of claim 7, wherein rotation of the second corkscrew-style cam relative to the first corkscrew-style cam causes the first and second helical surfaces to slidingly engage, and adjusts an axial length of the variable friction assembly.

9. The electronic display system of claim 8, wherein the variable friction assembly further comprises a friction production section, the friction production section further comprising: a rotating cam rotatably fixed to the shaft and having a first contact surface; and a fixed washer cam fixed relative to the housing and having a second contact surface: wherein engagement between the first and second contact surfaces resists rotation of the shaft.

10. An electronic display system, comprising:
a housing having a recess, a top side, and a bottom side opposite the top side;
a kickstand having a first end and a second end opposite the first end, the first end being rotatably coupled to the housing proximate the bottom side, and the second end being rotationally biased away from the housing;
a variable friction assembly coupled to the first end; and
a release assembly including an actuating member and a rocker arm, wherein the release assembly is to actuate the kickstand via the rocker arm in response to a depression of the actuating member;
wherein the kickstand has a first position in which the second end is received within the recess, and a second position in which the second end is substantially rotatably separated from the recess;
wherein the variable friction assembly is to apply a first friction load to the first end when the kickstand is the first position, wherein the variable friction assembly is to apply a second friction load when the kickstand is in the second position; and
wherein the first friction load is greater than the second friction load.

11. The electronic display system of claim 10, further comprising: a variable torque assembly coupled to the first end; wherein the variable torque assembly is to apply a first torque to the first end when the second end is the first position; wherein the variable torque assembly is to apply a second toque to the first end when the second end is in the second position; and wherein the first torque is greater than the second torque.

12. The electronic display system of claim 10, further comprising: a magnet disposed within the recess; and a metallic surface disposed on the second end of the kickstand; wherein the metallic surface is secured to the magnet when the kickstand is in the first position.

13. The electronic display system of claim 10, wherein the kickstand is angularly shifted over ninety degrees between the first position and the second position.

14. A electronic display system, comprising:
a housing having a top side and a bottom side opposite the top side;
a kickstand having a first end and a second end opposite the first end, the first end being rotatably coupled to the housing proximate the bottom side with a hinge further including a shaft, and the second end being rotationally biased away from the housing;
a variable friction assembly comprising a pair of corkscrew-style washers to apply a variable level of friction to the first end to resist rotation of the kickstand about the first end, based on the relative position of the second end and the housing; and
a variable torque assembly further comprising a torsional spring to rotationally bias the second end of the kickstand and to apply a variable level of torque to the first end opposing the variable level of friction; and
a release assembly including an actuating member and a rocker arm, wherein the release assembly is to actuate the kickstand via the rocker arm in response to a depression of the actuating member;
wherein the variable torque assembly applies an increasing torque load to the shaft as the second end approaches the housing, and
wherein the variable friction assembly applies an increasing friction load to the shaft as the second end approaches the housing.

\* \* \* \* \*